UNITED STATES PATENT OFFICE.

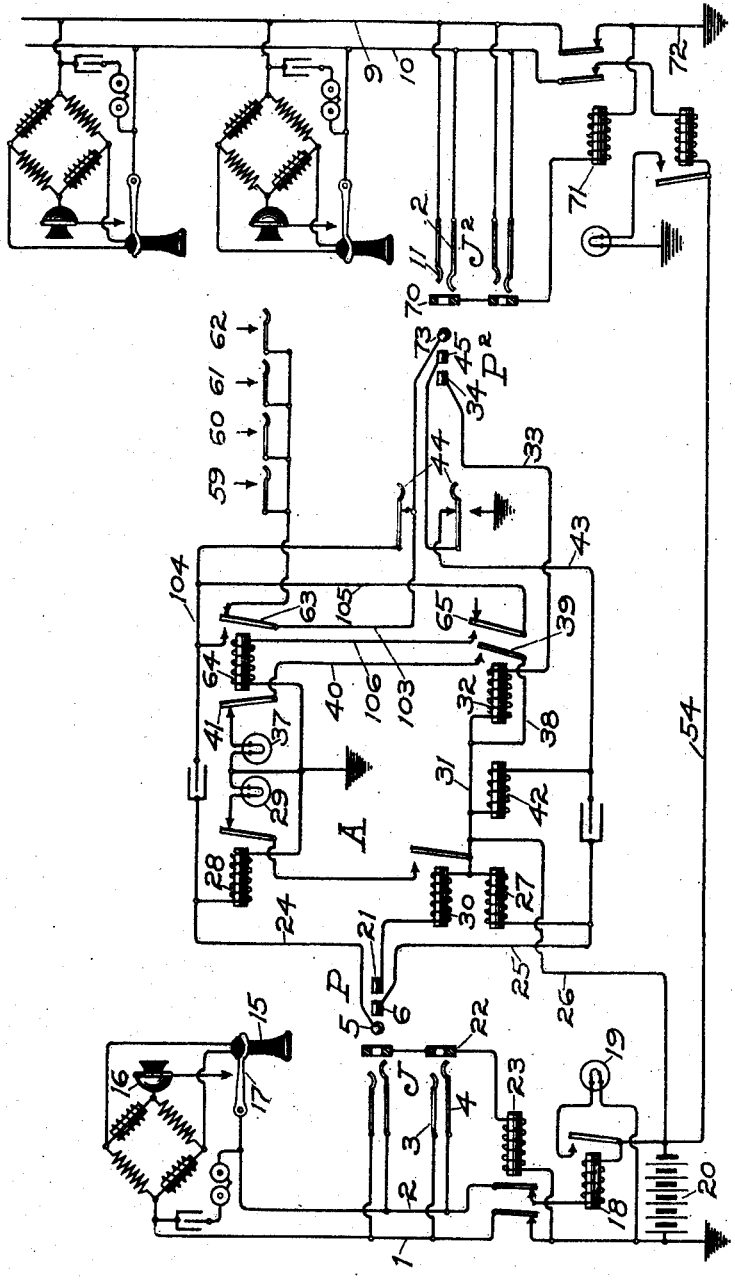

ALBION D. T. LIBBY, OF ELYRIA, OHIO, ASSIGNOR TO THE DEAN ELECTRIC COMPANY, OF ELYRIA, OHIO, A CORPORATION OF OHIO.

CENTRAL TELEPHONE SYSTEM.

972,628.  Specification of Letters Patent.  Patented Oct. 11, 1910.

Application filed May 28, 1909. Serial No. 498,912.

*To all whom it may concern:*

Be it known that I, ALBION D. T. LIBBY, a citizen of the United States, residing at Elyria, in the county of Lorain and State of Ohio, have invented certain new and useful Improvements in Central Telephone Systems; and I do hereby declare the following to be a full, clear, and exact description of the invention, such as will enable others skilled in the art to which it appertains to make and use the same.

My invention relates to central telephone systems of the three conductor cord type as distinguished from those systems employing only two cords. In the two-conductor cord systems it is necessary to operate the cord relays and the testing apparatus over the talking circuit. This causes an overloading of the cord circuit which may be obviated by employing additional conductors therein.

The object of my invention is to provide a cord circuit of the latter class which is simple in operation, easy to install, inexpensive both to construct and install, and one which may easily be constructed from a two-conductor cord already installed. I also provide a third conductor which is independent of the talking conductors in the cord, and one which eliminates shunts from the talking circuit.

My invention will be best understood by reference to the following description when taken in connection with the accompanying illustration showing one specific embodiment thereof, while its scope will be more particularly pointed out in the appended claims.

The figure is an illustration of my improved cord circuit shown in connection with substation lines.

The cord circuit is shown at A and the substation lines to the right and left thereof.

1 and 2 represent the mains of a substation line leading to the jack springs 3 and 4.

5 and 6 are the tip and sleeve contacts of the answering plug P.

9 and 10 are the mains of the right hand substation line leading to the jack springs 11 and 12.

The mains 1 and 2 are detachably connected through the line relay 18 to the battery 20, grounded at one of its poles. The line relay 18 controls the line signal 19. A third or ring contact 21 is shown in the cord circuit, and a ring 22 in the line jack. The cut-off relay 23 is connected between the ring and the grounded pole of the battery.

24 and 25 are the answering ends of the cord circuit.

26 is a branch of the third conductor leading from the battery 20 through induction coil 27 and 42 to the cord strand. The tip supervisory relay is shown at 28, the sleeve supervisory relay at 30; the supervisory lamps at 29 and 37. A branch conductor 31 leads through the supervisory relay 32 which is connected by the conductor 33 to the ring 34 at the answering end of the cord. The relay 32 controls the switch 39 which is in the circuit of the supervisory lamp 37 and the switch 65 which is in the circuit of a supervisory relay 64. A conductor 38 connects switch 39 to the conductor 31. A conductor 40 connects a switch 41 with the switch 39. A conductor 106 connects the switch 65 with the supervisory relay 64. This relay controls the switch 41 and the switch 63 in the ringing circuit. A conductor 105 connects the switch 65 with the tip side of the calling end of the cord.

59, 60, 61, and 62 are the ringing springs.

103 is a conductor leading from the ringing springs to the ringing key 44.

The ring contact 70 of the right hand substation line is connected through the cut-off relay 71 and the conductor 72 to ground. The line relay is connected through conductor 54 to the live pole of battery 20.

The operation of my system is as follows: Supposing a party on the left hand line desires a party on the right hand line, he removes his receiver from the hook which places a low resistance bridge on the line. A circuit is then completed through the switch hook 17, transmitter 16, the resistance and choke coils of the Wheatstone bridge effect on receiver 15, at the substation, the mains 1 and 2, the line relay 18, and the battery 20. This energizes the line relay which pulls up its armature and lights the signal 19. On observing this, the operator inserts her answering plug into a jack of the line. A circuit is completed from the battery 20, 26, 30, 21 22, cut-off relay 23, back to battery. Over this the relay 23 is energized, cutting off the line relay 18, and extinguishing the line signal. The relay 30 is also energized over this circuit, closing the circuit of the supervisory signal 29 which would be illuminated were not its circuit broken at the contacts of the relay 28 which is energized from ground over the conductor to 28, 24, to the substation, through the substation bridge, back to the sleeve side, over 25, impedance coil 27, 26, and 20, back to ground. The operator then operates her listening key which connects her telephone set (not shown) to the line. Having ascertained that the party on the right hand line is desired, she inserts her calling plug P' into a jack of that line. The cut-off relay is immediately operated over the following circuit: the live pole of the battery 20, conductor 26, the third cord conductor 31, relay 32, 33, 34, 70, 71, to ground at 72, and back to battery. This energizes the relays 32 and 71. 71 cuts off the line and 32 closes contacts in the circuit of the answering supervisory signal 37 and the answering supervisory relay 64. The supervisory signal 37 is energized and lights up. The operator then rings the subscriber, and upon the subscriber's answering, the relay 64 is energized over a circuit from ground to 64, 106, 65, 104, to and through the substation, back to the sleeve 45, 43, 42, 26, battery 20, to ground. This cuts off the source of ringing current, completes the cord circuit, and interrupts the circuit of the supervisory signal 37. It will be noted that the supervisory relays 30 and 32 are in circuits which are independent of the talking circuit, and that the current necessary to energize these relays, does not pass through the talking circuit. The voice currents are prevented from passing into this third conductor by the impedance coil 27 and 42. It will also be noted that the circuit of the relay 64 is under control of the relay 32. In connection with this cord circuit I have provided a substation line which is normally detachably connected thereto. When the conversation between the subscribers has terminated and they restore their receivers to the hooks, the circuits of the supervisory relays 28 and 64 will be broken so their armatures will fall back, completing the circuits of the supervisory signals which light up and apprise the operator of that fact. The operator then removes the plugs from the jacks whereupon the whole system is restored to normal condition.

The back contact of the relay armature 65 leads to the test. It will thus be seen that I provide means independent of the talking circuit for controlling the busy testing circuit.

While I have shown my improvement in this specific form, it will be evident to those skilled in the art that numerous and extensive departures from the form and details of the apparatus here shown, may be made without departing from the spirit of this invention, the same being herein shown solely for the purpose of clearly illustrating such specific embodiment.

I claim—

1. In a telephone system, the combination with telephone lines of a cord circuit for connecting two of said lines together, said cord including a tip and a sleeve strand, a third conductor in said cord independent of the talking strands, a source of current, two supervisory relays in the answering end of said cord circuit, one of said relays connected through the tip side of the line and the second through said third conductor.

2. In a telephone system, the combination of a plurality of telephone lines extending from substations to a central office, circuit connections for connecting any two of said lines together for conversation, said circuit connections consisting of a tip and a sleeve conductor constituting the talking connections and a third conductor independent of the talking conductors, a supervisory signal in each end of said connections, circuits therefor, a relay in each end of said connections connected to the third conductor adapted to close the circuit of its supervisory signal when the circuit connections are connected to a telephone line, and other relays, one in each end of the circuit connections connected to the tip side thereof controlling the supervisory signals.

3. In a telephone system, the combination of a plurality of telephone lines extending from substations to an exchange, circuit connections for connecting said lines together for purposes of conversation, a conductor in said circuit connections independent of said conversation circuit, a signal in said circuit connections, a relay controlling the circuit thereof, a second relay located in said independent conductor controlling the circuit of said first named relay.

4. In a telephone system, a telephone line, a three-conductor cord circuit, one of the conductors being isolated from the other two, means normally detachably connecting said telephone lines and said third conductor, a supervisory signal, a supervisory relay, a second supervisory relay located in said third conductor and controlling said signal and said first named supervisory relay.

5. In a telephone system, the combination of a plurality of telephone lines, circuit connections for connecting said lines together for purposes of signaling and conversation, a source of signaling current in said circuit connections for signaling a called subscriber, means for connecting said source to a called line and a pair of supervisory relays in the circuit connections controlling said signal source connecting means, one of said relays connected in said circuit connections independently of said conversation circuit.

6. In a telephone system, a telephone line, a cord circuit consisting of a talking circuit and a third conductor independent thereof, a source of current and a supervisory relay in circuit with the third conductor, a cut-off relay adapted to be connected to the third conductor, a signal and a second supervisory relay controlled by the supervisory relay in the third conductor.

7. In a telephone system, a telephone line, a cord circuit consisting of a talking circuit and a third conductor, means for isolating the third conductor from the talking circuit, a supervisory relay in the third conductor, a signal and a second supervisory relay both controlled by the first named supervisory relay, means normally detachably connecting the line and the third conductor, means actuated to detach said line from said third conductor and adapted to be so actuated when the first-named relay is energized.

8. In a telephone system, the combination of a plurality of telephone lines extending from subscribers' stations to an exchange, circuit connections for connecting said lines together, a source of signaling current associated with said circuit connections for signaling a called subscriber, a supervisory signal in said circuit connections, a relay controlling said signal and adapted to be energized when said circuit connections are connected to a telephone line over circuit connections independent of the conversation circuit, means for connecting said signaling source to a called line, said means controlled by said relay.

In testimony whereof I affix my signature in presence of two witnesses.

A. D. T. LIBBY.

Witnesses:
T. M. LIBBY,
W. B. MANSON.